March 1, 1960     T. F. STACY ET AL     2,926,412
PRESS
Filed Dec. 31, 1953     6 Sheets-Sheet 1

FIG. I

INVENTORS
THOMAS F. STACY
MURRAY C. TRIBBETT
BY Parker, Prochnow & Farmer
ATT'Y.

FIG. 3

INVENTORS
THOMAS F. STACY
MURRAY C. TRIBBETT
BY
ATT'Y

FIG. 5

INVENTORS
THOMAS F. STACY
MURRAY C. TRIBBETT
ATT'Y.

United States Patent Office 2,926,412
Patented Mar. 1, 1960

2,926,412

PRESS

Thomas F. Stacy and Murray C. Tribbett, Piqua, Ohio, assignors to The French Oil Mill Machinery Company, Piqua, Ohio Application December 31, 1953, Serial No. 401,624

12 Claims. (Cl. 25—56)

This invention relates to fluid operated presses for forming loose materials into highly compressed cakes or blocks. It is particularly applicable to the formation of loose salt into cakes, generally in the manner disclosed in U.S. Patent No. 1,893,996 of January 10, 1933.

An object of this invention is to provide an improved apparatus for compressing charges of loose material into high density cakes or blocks, with which the cake will have approximately the same density at both ends.

Another object is to provide a press of this type which will be exceptionally simple in construction and operation, which will have simple and easily manipulated controls, with which the operations of the controlling valves for successive steps in a cycle of operation, after a cycle of operation has been initiated, may be easily operated in proper sequence under the control of moving parts of the press, and which will operate with a minimum of skilled attention.

Other objects and advantages will be apparent from the following description of some embodiments of the invention and the novel features will be particularly pointed out hereinafter in connection with the appended claims.

Figure 1:
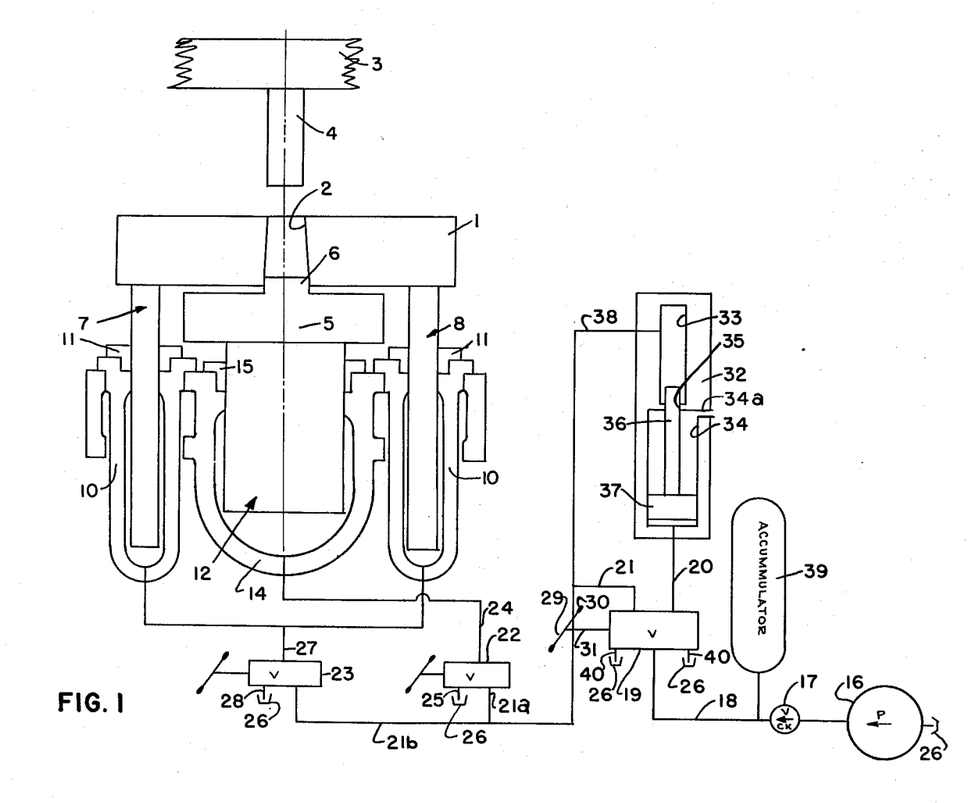
Fig. 1 is a diagram of a simple hydraulic press, with simple controls, constructed in accordance with this invention.

In the embodiment of the invention illustrated in Fig. 1, the press is generally of the type shown in U.S. Patent No. 1,893,996, but is an improvement thereon. It includes the mold block 1 having a passage 2 from face to face therethrough, as usual in salt press molds. Disposed above the mold block 1 is a top part or crosshead 3 of the frame, from which depends a piston 4 which is axially alined with the passage 2, and of a size and shape to enter and move along the passage in close proximity to the passage wall and close its upper end. Disposed below the mold block 1 is a piston or member 5 which has an upstanding piston part or plunger 6 which is axially alined with the passage 2. The part 6 is of a size and shape to enter and move upwardly along the lower part of the passage 2 in close proximity to the passage wall.

A pair of auxiliary rams 7 and 8 are attached to the mold block 1 to move with it toward and from the piston 4. Each of these auxiliary rams extends into and reciprocates in the open, upper end of a cylinder 10. A packing gland 11 surrounding each ram 7 and 8 seals the ram at the upper end of the cylinder. A main ram 12 is disposed between the auxiliary rams and operates the piston 5. This main ram depends from the piston 5 and is slidingly received in the open, upper end of an upright main cylinder 14. A packing gland 15 seals the opening in the upper end of the main cylinder into which the ram 12 extends.

A suitable source of power, such as a continuously operating, relatively low pressure pump 16, is connected through a check valve 17 and a pipe 18 to a distributing valve 19. This valve operates to connect the pipe 18 alternately to pipes 20 and 21. The pipe 21 is connected by a branch 21a to a valve 22, and by a branch 21b to a valve 23. The valve 22 serves to connect the branch 21a to a pipe 24, or to disconnect it from the pipe 24 and at that time connect pipe 24 to a release pipe 25 leading to a reservoir 26. The pipe 24 is connected to the lower end of the main cylinder 14 so as to deliver actuating fluid under pressure beneath the ram 12.

The valve 23 serves to connect the branch pipe 21b to a pipe 27, and when this valve disconnects the pipe 27 from the branch 21b, it connects it to a pressure relief pipe 28 that also leads to reservoir 26. The pipe 27 has two branches, both of which lead to the chambers of the auxiliary rams so as to deliver fluid under pressure beneath the auxiliary rams 7 and 8. In this example of the invention, each of these valves 19, 22 and 23 is shown as manually operated by a pivoted lever 29, pivoted at 30 and having a pin and slot or link connection to an operating stem 31 of the valve.

Pipe 20 leaving the valve 19 is connected to an intensifier 32. These intensifiers are common in the hydraulic industry and, briefly described, they comprise a housing provided with a small pressure chamber 33 and a large chamber 34 which communicate with one another through a passage 35. A piston rod 36 slides in the passage 35 and extends at one end into the chamber 33 and at its other end into the chamber 34. The end of the piston 36 which is within the chamber 34 is connected to a piston head 37 which fits the chamber 34. When fluid under pressure from the pump 16 is delivered to the pipe 20 and through it to the lower end of the chamber 34, it forces piston head 37 upwardly toward the small chamber 33, and in doing so, the small end of piston 36 displaces or forces liquid in the chamber 33 outwardly through a pipe 38 which is connected to the pipe 21. Since the piston head 37 is much larger than the end of the piston 36 which is within the chamber 33, the total pressure of the fluid delivered from the chamber 33 is under a much higher pressure than the fluid pressure delivered to pipe 20. An accumulator 39 may be connected to the pipe 18 between the check valve 17 and valve 19. Chamber 34 has a vent 34a at its end nearest chamber 33.

Valve 19 is what may be called a two-way valve, in that it connects the pipe 18 alternately to the pipes 20 and 21, and it vents those pipes alternately, by pipes 40 leading to the reservoir 26, whenever either of the pipes 20 and 21 at any time is cut off from the pipe 18.

In the operation of a press constructed in this manner, a measured quantity of loose material, such as loose salt, is disposed in the upper end of the mold passage 2 when the mold block 1 is in its lower position, as shown. At this time the plunger or piston part 6 is just within the lower end of passage 2, and the relatively fixed piston 4 is above the open, upper end of passage 2. The valve is then operated to connect pipe 18 to pipe 21. This transmits a fluid or liquid under relatively low pressure to each of the valves 22 and 23. The valve 22 is next operated to connect the pipe branch 21a to the pipe 24, and this delivers the fluid under low pressure to the interior of the main ram cylinder 14. Continued delivery of fluid under pressure into the chamber of cylinder 14 beneath the ram 12 displaces the plunger upwardly and causes the piston 5 to rise. The piston 5 picks up the mold block 1 and they rise together toward the fixed piston 4, raising auxiliary rams 7 and 8 with them. At this time the valve 23 connects the pipe 27 to vent pipe 28 which leads to the reservoir and, therefore, as the auxiliary rams 7 and 8 rise with the mold block, the vent will draw fluid from the reservoir 26 into the auxiliary ram cylinders and fill them.

After the mold block 1 and the piston 5 have risen to a desired extent, and after the fixed piston 4 is within the passage 2, and some compression of the loose material has occurred, the valve 23 is operated to connect the pipe 27 to the branch pipe 21b. It will be understood that if desired, the valve 23 could have been operated at the same time as valve 22 to deliver fluid under pressure to the auxiliary rams at the same time that it was delivered to the main ram, but this would slow down the operation of ram 12 because the delivered fluid under pressure would then be shared between all of the cylinders. By not operating valve 23 until a desired position of the mold block has been reached, the cylinders of the auxiliary rams are prefilled by suction, and all of the fluid from the source under pressure that is from the pump 16 is used to advance the main ram 12.

After the mold block 1 has reached a desired position, and the valve 23 has been operated to connect pipe 27 to branch pipe 21b, one operates the valve 19 to connect the pipe 18 to pipe 20 and disconnect pipe 21 from pipe 18. The fluid from the pump 16 is then used to actuate the intensifier 32, and a lesser quantity of the fluid but under a higher pressure, is delivered to pipe 38 and through it to pipe 21. This then forces the main ram upwardly at a slower rate but higher pressure, and the material in the passage 2 is then highly compressed therein between the opposed, relatively approaching pistons 4 and 6. At this time the fluid pressure per unit area on the auxiliary rams will be the same as in the main ram and the mold block may move upwardly or downwardly to a limited extent relatively to the opposed plungers or pistons, so that in a sense it floats along the pistons 4 and 6.

During the initial advance of the main ram under the relatively low pressure of fluid, it will reach a point where it will come to rest because of the resistance offered by the loose material in the mold passage 2. It is just before this point is reached that the low pressure should be admitted by operation of the valve 23 to the auxiliary rams to raise them to a required point so that the required clearance is obtained between the mold block and the piston 5. When this required clearance is obtained, high pressure is applied to the main ram by operation of valve 19 to compress the block from the loose material under the desired high pressure. At this time the pressure on the rams 7 and 8 may be reduced to zero by operating the valve 23 to connect the pipe 27 to release pipe 28. This then allows the mold block 1 to float as the loose material in the passage 2 is formed into a cake or block under high pressure. This floating action gives equal density at both ends of the formed block or cake in the passage 2.

After the cake is formed in this manner, the valve 23 is operated to cut off the high pressure caused by the intensifier and the valve 22 is operated to disconnect pipe 24 from pipe 21a and connect it instead to the relief pipe 25. This allows the fluid in the main ram to escape and the piston 5 to lower itself by gravity. This withdraws the piston part 6 from the lower end of the passage 2. One then operates the valve 23 to connect the fluid under pressure in pipe 21b to the pipe 27. This causes an advance of the auxiliary rams to advance or carry the mold block 1 farther along the fixed piston 4, which forces the formed block out of the passage 2. The passage 2 may be slightly divergent downwardly in order to facilitate release of the block from the passage 2. It will be understood that the valves 19, 22 and 23 may be operated by suitable cams carried by the piston 5 and mold block 1, but inasmuch as it is common practice to have a press operate valves that control its activities, the cams and connections to the valves have not been illustrated.

Figure 2:
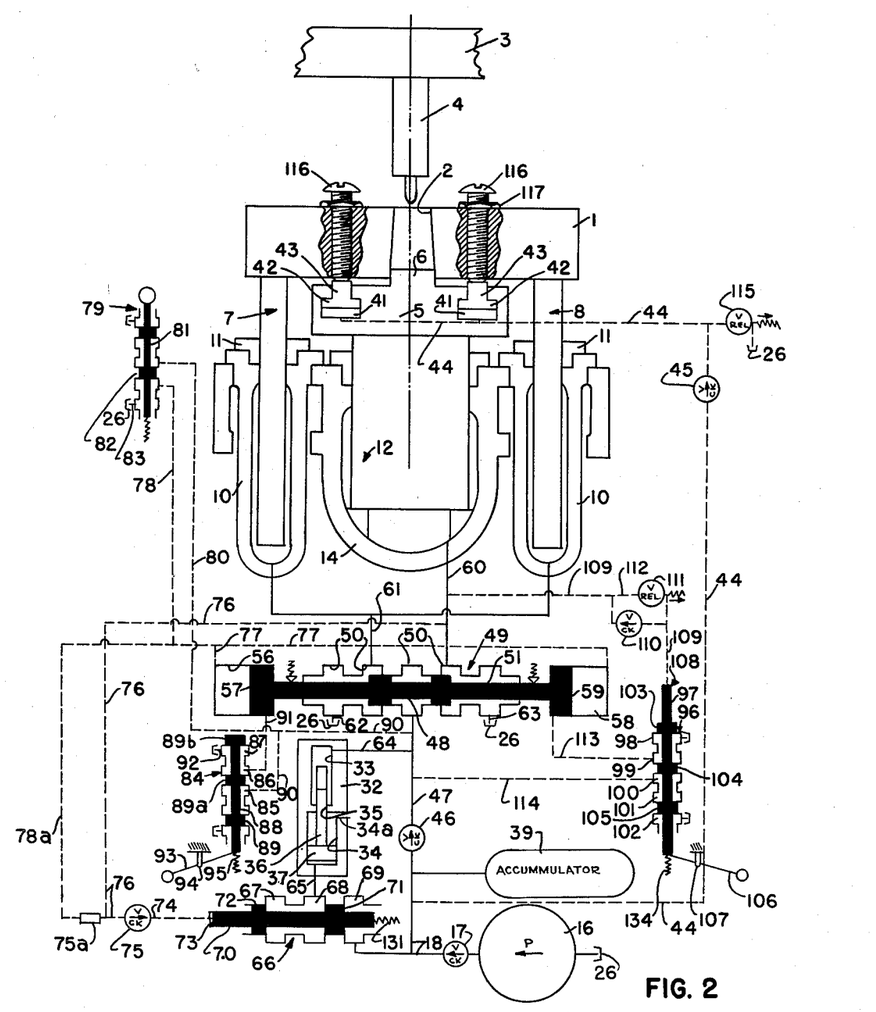
Fig. 2 is a diagram of a similar press, with more elaborate controls for the various steps in the operation of the press, and representing another embodiment of the invention, the parts being in the relative positions occupied when the press is open and idle.
Figures 6, 7, 8:
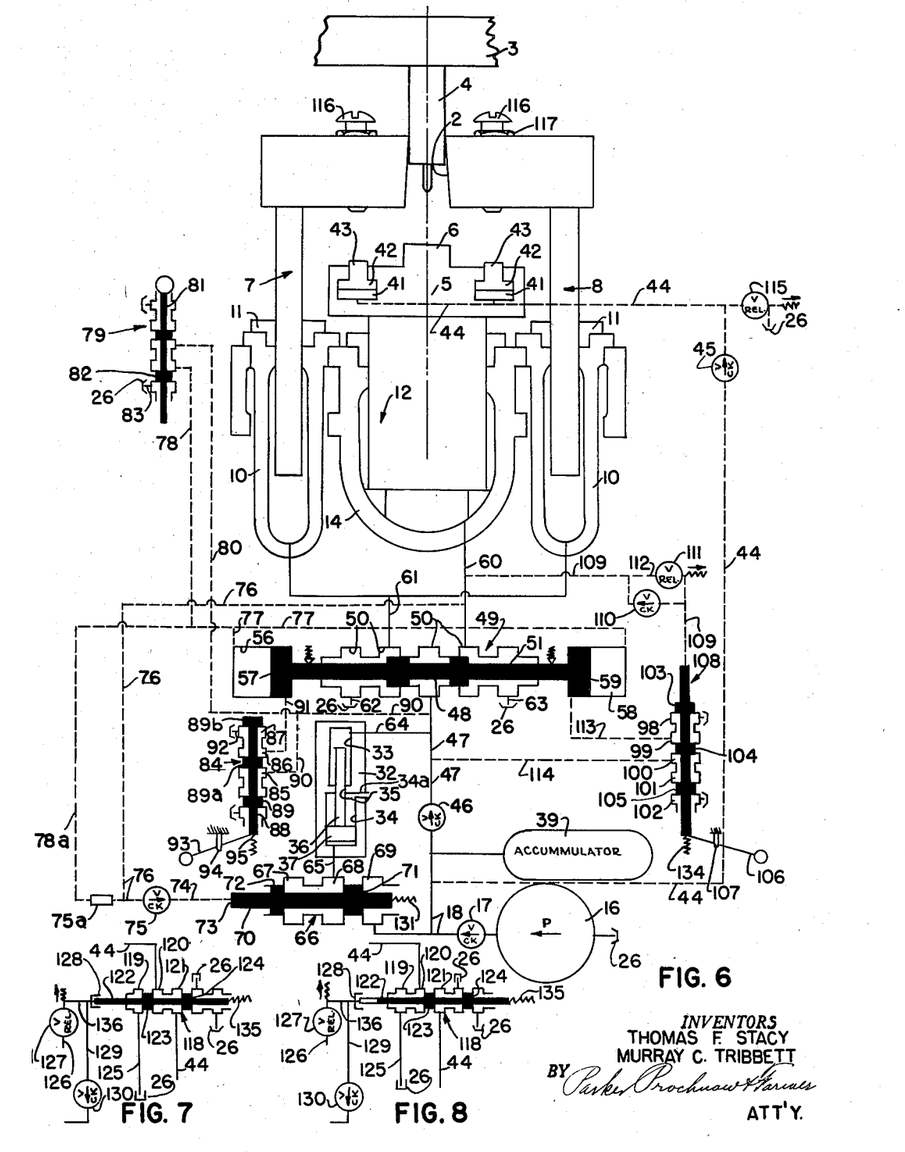
Fig. 6 is a similar diagram, but with the parts in the relative positions occupied during return of the parts to open and idle position.
Figs. 7 and 8 are diagrams illustrating modifications of certain details for the control of the spacer elements between the advancing piston and the mold blocks.

Referring next to Figs. 2 and 6 inclusive, another embodiment of the invention is illustrated. In this embodiment, parts which are also found in Fig. 1, are given the same reference characters as in Fig. 1, and will not be redescribed. Referring now to Fig. 2 particularly the piston 5 is provided with limited cylinders 41, and piston heads 42 reciprocate vertically in these cylinders 41. Each piston head 42 is provided with an extending piston 43 which projects upwardly to or above the upper face of the piston 5 so as to engage with the under face of the mold block 1. When the piston heads 42 are in the upper positions engaging the upper ends of the cylinder, as shown in Fig. 2, the pistons 43 will extend above the upper face of the piston and space the mold block 1 above the upper face of the piston by a desired amount and with the piston part 6 just within the lower end of the passage 2.

The bottom of each of the cylinders 41 is connected by a pipe 44 to the delivery pipe 18 of the low pressure pump 16. A one-way check valve 45 is included in the pipe 44 so as to pass fluid from the pump only to the cylinder 41 and thus normally keep the pistons 43 extended as shown in Fig. 2, that is, keep them in spacing positions between the mold block 1 and piston 5. The pipe 18 from the pump 16, beyond the connection to the pipe 44 is provided with a one-way check valve 46, the delivery side of which is connected to a pipe 47 that leads to the chamber 48 of a main, four-way valve 49. This valve 49 has a plurality of annular grooves 50 in its chamber wall that are spaced apart lengthwise along the valve, and the pipe 47 opens into the center one of these annular grooves 50. A valve element 51 is disposed in the chamber 48 so as to reciprocate endwise therein, and this valve element has a pair of lands 52 and 53 spaced apart in the direction of reciprocation.

Figure 3:
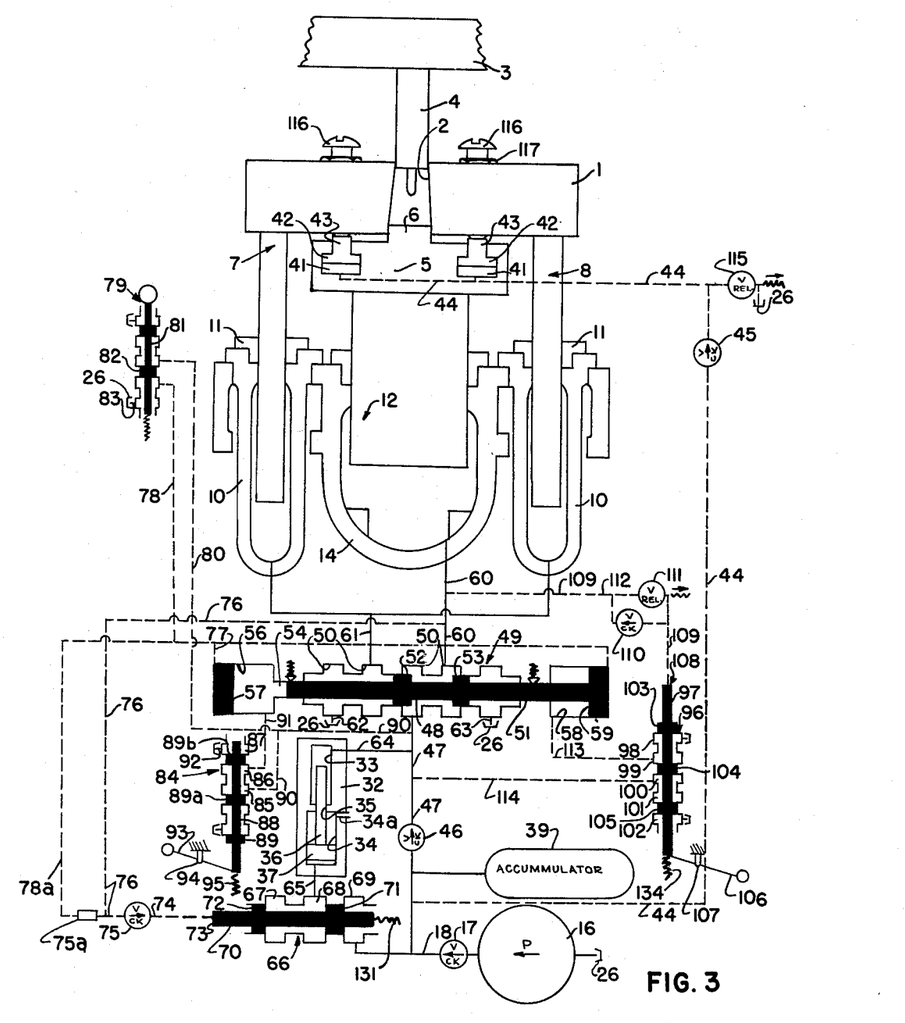
Fig. 3 is a similar diagram, but with the parts in the relative positions they are in during low pressure closing of the press.
Figure 5:
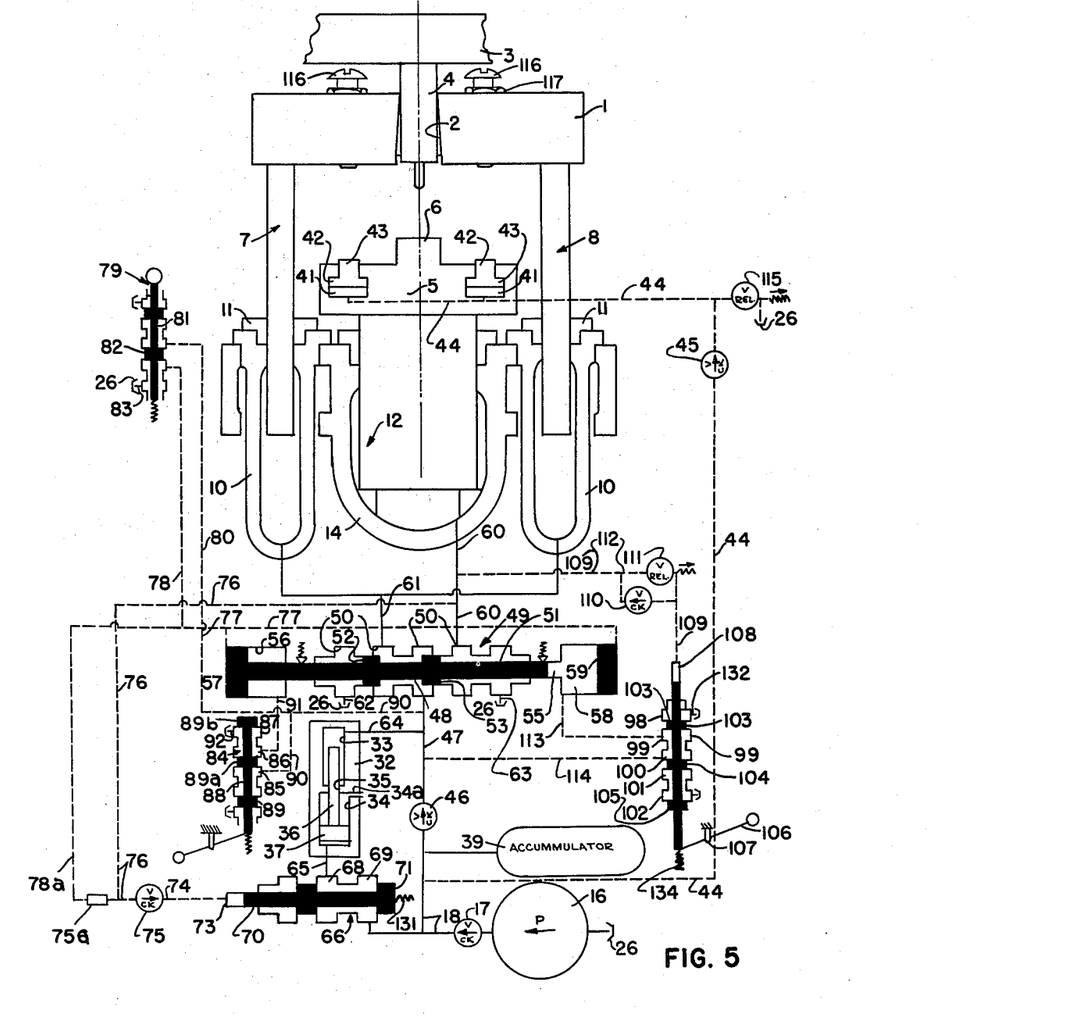
Fig. 5 is a similar diagram, but with the parts in the relative positions occupied during ejection of the formed cake or block.

The ends of the valve element 51 extend beyond the ends of the housing of the valve 49, at one end into the passage 54, Fig. 3, and at its other end into passage 55, Fig. 5. The passage 54 opens into a relatively large cylinder 56 in which is a reciprocating piston 7. The passage 55, Fig. 5, opens into a relatively large cylinder 58 in which is disposed a reciprocating piston 59. The pipe 47 opens into the central, annular groove 50, and the annular groove 50 next to the central one is connected by pipe 60 to the bottom of the cylinder 14 of the main ram. The annular groove 50 at the opposite side of the center groove 50 is connected by a pipe 61 to the lower ends of the auxiliary ram cylinders 10. The annular groove next beyond that into which pipe 61 opens is connected by pipe 62 to reservoir 26. The annular groove 50, second from the center groove 50 and beyond the groove connected to the pipe 63, is connected by a pipe 63 to reservoir 26. When both cylinder pistons 57 and 59 are forced toward each other into the positions shown in Fig. 2, they will engage with the ends of the valve element 51 and place and hold it in its central position shown.

The land 53 is between the annular grooves 50 that are connected to pipes 47 and 60. At the same time the land 52 is between the annular grooves 50 into which the pipes 47 and 61 open, and thus the pipe 47 is not connected to either pipe 60 or 61. A pipe 64 connects the pipe 47 and the chamber 33 of a pressure intensifier 32. The chamber 34 of the intensifier is connected by a pipe 65 to an intensifier valve 66. This valve 66 has a plurality of annular grooves 67, 68 and 69 spaced apart along the valve housing, and a valve element 70 extends through the housing of this valve 66 and reciprocates endwise therein. The valve element carries a land 71 which is normally between the grooves 68 and 69 when the intensifier valve is inactive. The groove 69 is connected to the pipe 18, and when the land 71 is between grooves 68 and 69, it prevents passage of low pressure fluid from pipe 18 to the low pressure chamber 34 of the intensifier 32.

The valve element 70 also carries land 72 which is spaced from land 71 and is immediately left of the groove 67. When this intensifier valve is operated, its valve element 70 is moved from the position shown in Fig. 2 to the position shown in Figs. 4 and 5, whereupon the grooves 68 and 69 are in communication with one another, which connects the pipe 18 to the pipe 65 and the intensifier. The valve 70, at the left end in Fig. 2, extends into a pilot cylinder 73 so that when fluid under pressure is admitted to the pilot cylinder 73, it will force the valve element 70 to the right from the Fig. 2 position, into the position shown in Fig. 4. A pipe 74 connects the cylinder 73 to the delivery side of a one-way check valve 75 and the other side of the valve 75 is connected by a pipe 76 to the pipe 60. A branch pipe 78a leads from pipe 78 to a pilot ram 75a that operates on check valve 75 to forcibly open it.

The outer ends of the cylinders 56 and 58 of the main valves are connected to a pipe 77, and this pipe 77 is connected to a pipe 78 which leads to one port of a pilot valve 79. Another port of the valve 79 is connected by a pipe 80 to the pipe 47. The valve 79 has a valve element 81 which reciprocates endwise in the valve housing and connects the pipe 80 to the pipe 78, or by valve land 82 interrupts passage between those pipes, and when the communication between those pipes is interrupted by the valve land 82, the pipe 78 communicates with a pipe 83 which leads to reservoir 26 so as to relieve pressure in the pipe 78.

A pilot valve 84 is also provided with a plurality of spaced annular grooves 85, 86 and 87, and a valve element 88 reciprocates endwise in the housing of valve 84. This valve element 88 carries a plurality of spaced lands 89, 89a and 89b. A pipe 90 connects the annular groove 85 of the pilot valve 84 with the pipe 47, and a pipe 91 connects the annular groove 86 of the valve 84 to the inner end of the chamber 56 of main valve 49. Chamber 87 is vented to reservoir 26 through pipe 94. An operating handle 93 pivoted at 92 is connected by linkage or a pin and slot connection to the valve element 88, so as to operate it in a downward direction in Fig. 2 in opposition to a spring 95 which resiliently acts against downward movement of the valve element 88.

Another pilot valve 96 is provided with an endwise reciprocating valve element 97, and the housing of this valve is provided with a plurality of annular grooves 98, 99, 100, 101 and 102. The valve element 97 is provided with spaced apart lands 103, 104 and 105. An operating hand lever 106 pivoted at 107 is loosely connected to the outer end of the valve element 97 so as to enable one to move the valve element 97 downwardly in Fig. 2. The upper end of the valve element 97 reciprocates in a pilot cylinder 108, see Fig. 5, which is connected by a pipe 109 to the pipe 60. A one-way check valve 110 is contained in the pipe 109 and permits fluid flow only towards the pipe 60. A pressure relief valve 111 is connected in a branch pipe 112 across the check valve 110 so that it will pass fluid from the pipe 60 to the cylinder 108 when the pressure in the pipe 60 is above a selected pressure for which this pressure relief valve 111 is set.

The annular groove 99 is connected by a pipe 113 to the inner end of the cylinder 58 at one end of the main valve 49. The annular groove 100 of the valve 96 is connected by a pipe 114 to the pipe 47. Groove 98 of the valve 96 is connected to reservoir, as is also groove 102. The pipe 44, between the check valve 45 and the cylinders 41 in the piston 5, is connected through a pressure relief valve 115 to reservoir 26, and it opens to pass fluid from the cylinder 41 to reservoir when the pressure in those cylinders exceeds a pressure for which the valve 115 is set to open.

The mold block 1 is provided with screws 116 which are threaded through the block 1 from face to face in alinement with the pistons 43 that extend from the upper face of the piston 5. A lock nut 117 on each screw 116 by engagement with the upper face of the mold block 1, serves to hold that screw in different adjusted positions as it is threaded through the block. By adjusting the screws 116 to extend to different distances below the lower face of the block 1, it is possible to vary the spacing between the block 1 and piston 5 which is created by the pistons 43 when in their upper or spacing positions.

Referring next to Fig. 7, a slight modification is illustrated for the control of the fluid in the cylinders 41. In this embodiment the pipe 44 from the cylinders 41 is connected to the center part of a valve 118. There are three annular grooves 119, 120 and 121 spaced apart in succession along the housing, and a valve element 122 reciprocates endwise in the housing and carries spaced lands 123 and 124. When valve element 122 is in the position shown in Fig. 7, the land 123 is between grooves 119 and 120, and grooves 120 and 121 are in communication with each other, which connects the lower section of pipe 44 from the low pressure pump to the upper section of pipe 44. The groove 119 is connected to the reservoir 26 by a pipe 125. A pipe 126 connects the main cylinder pipe 60 through a pressure relief valve 127 to a cylinder 128 in which one end of the valve element 122 reciprocates as a piston. Therefore, whenever the pressure in the main cylinder is above a selected pressure for which the valve 127 is set to open, fluid under pressure will pass from the main cylinder pipe 60 to the cylinder 128 and force the valve element 122 to the right into the position shown in Fig. 7. This carries the land 123 between grooves 120 and 121 so as to disconnect the pipe 44 from the low pressure pump, and connect the cylinders 41, through the upper section of pipe 44, to the reservoir through groove 119. This releases the pressure in the limited cylinders 41 whenever the high pressures are effective on the main ram, and this allows easy retraction of piston 43 and permits a freer floating of the mold block 1. When the pressure in the main cylinder pipe 60 falls, fluid from the cylinder 128 may escape through a pipe 129 having a free check valve 130 back to the pipe 126 and pipe 60 so as to bypass the pressure relief valve 127. There are additional annular grooves in the housing of valve 118, at the right of groove 121 in Figs. 7 and 8, since a standard valve with five grooves is employed, which additional grooves are connected to reservoir to drain any leakage past land 124 back to the reservoir.

In the operation of the embodiment of the invention illustrated in Figs. 2 to 6, when the press is open and idle, the parts are in the relative positions shown in Fig. 2. At this time the main ram and auxiliary ram are both retracted, and the valve element 51 of the main valve 49 is in its central position into which it has been moved by the pistons 57 and 59 which abut against the ends of the valve element. The pipe 47 from the pump 16, which is connected to the center annular ring 50, delivers fluid under relatively low pressure to that central part of the valve chamber, but the lands 52 and 53 prevent escape of the fluid, and the fluid cannot pass to either the main ram or auxiliary rams. The intensifier is inactive and the small piston end 36 is retracted from chamber 23 as far as possible. Pressure is applied, however, to the limiting cylinders 42 so as to hold the spacing pistons 43 in their spacing positions to hold the block number 1 in the desired spaced relation to the piston 5.

Let it be assumed that an operation of the press is desired. One first places a measured charge of the loose material in the passage 2 where it rests upon the upper face of the piston 6. The pilot valve 84 is then operated to start an upward movement of the rams, and to do this the lever 93 is operated to move the valve element 88 downwardly in Fig. 2, which is into the position shown in Fig. 3. When this happens, the land 89a which was previously disposed between the annular grooves 85 and 86 so as to interrupt communication between pipes 90 and 91, upon operation of the valve, moves into a position below the groove 85, and the land 89b moves into the space between the annular grooves 86 and 87. This connects the pipes 90 and 91, and since the pipe 90 is connected to the pipe 47 that leads from the pump to the main valve, fluid under pressure from the main pump will pass through pipes 90 and 91 to the cylinder 56 at the right or inner end of cylinder 56, which is behind the piston 57. This moves piston 57 to the left so that the main valve element 51 is then free to move to the left.

The same pressure which enters the cylinder 56 will pass into the smaller cylinder 54, see Fig. 3, and it forces the valve element 51 to the right into the position shown in Fig. 3. When this happens, the valve element 51 moves the piston 59 to the right in the chamber 58. When the valve element 51 moved into the right end position, shown in Fig. 3, the land 52 moved into the space between the annular grooves 50 that are connected to the pipes 47 and 61, so that none of the low pressure fluid can pass to the auxiliary rams, but the land 53 has moved past the opening to pipe 60 that leads to the main ram cylinder. Fluid under pressure from the pump can then pass through pipe 18, check valve 46, pipe 47, the chamber of the main valve 49, and pipe 60 to the main ram cylinder.

This forces the ram to advance, and in advancing, the piston 5 moves with it, and through the spacer pistons 43, it carries the mold block 1 upwardly with it toward the relatively fixed piston 4. The same movement continues until the mold block 1 begins to telescope with the piston 4; that is, until the piston 4 enters and passes along the passage 2 to partially compress the loose material that was placed in the passage 2, as shown in Fig. 3. During all of this movement, the fluid pressure from the pump was continuing to hold the spacer pistons 43 advanced, so as to keep the mold block 1 in spaced relation to the piston 5, but with the piston end 6 within the passage 2. The parts are then in the position as shown in Fig. 3.

During this advance, fluid under pressure is in the pipe 60, and part of it passes from the pipe 60 through pipe 76 to the free check valve 75, through that valve and pipe 74 to the cylinder 73 in the intensifier valve 66. When the main ram comes to rest, because the resistance due to the compression of the material in the passage 2 between the pistons 4 and 6 has approximately balanced the force created by the low pressure fluid in the main ram, or just prior to this balancing, the pressure is then sufficient to force the valve element 70 to the right from the Fig. 3 position to the Fig. 4 position against the action of a spring 131. With this valve element 70 in the position shown in Fig. 4, fluid under pressure from pipe 18 and the pump may now pass into annular groove 69 of the valve 66, thence to the groove 68, and then through pipe 65 to the lower end of the chamber 34 of the intensifier.

Figure 4:
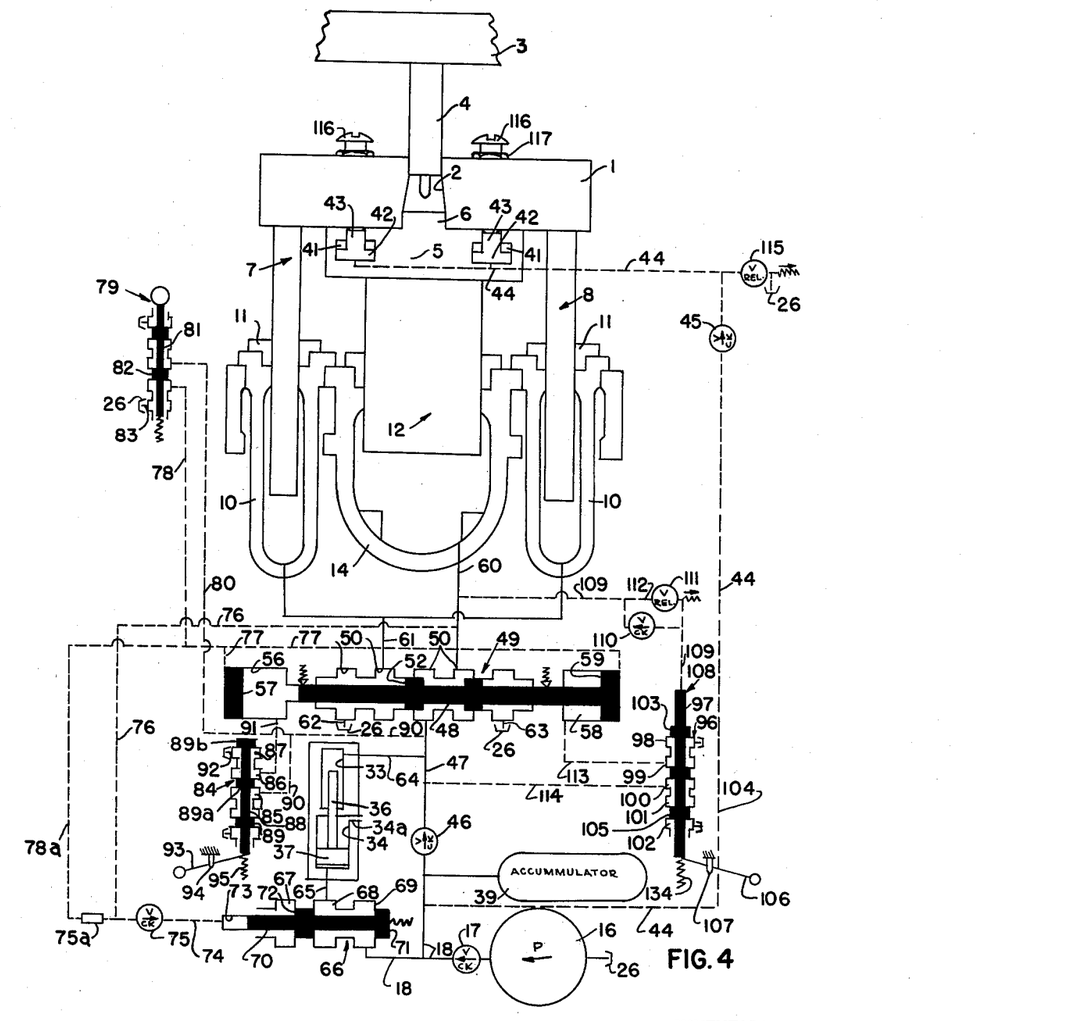
Fig. 4 is a similar diagram, but with the parts in the relative positions occupied during high pressure closing of the press and final high compression of the cake.

This pressure then forces the piston 37 of the intensifier upwardly, and forces piston 36 along the chamber 33, and because of the differences in size of the pistons 36 and 37, fluid will be displaced from the chamber 33 in smaller quantity but under a higher pressure than it enters the chamber 34, and this fluid under higher pressure passes through pipe 64 into the pipe 47 above the free check valve 46. The check valve 46 then seats, so that none of this intensified fluid can pass back toward the pump, and it then passes through the main valve 49 to the cylinder 14 of the main ram, so as to further advance the main ram and compress the material of the passage 2 still further, as shown in Fig. 4.

While the main ram was advancing and carrying with it the pistons 9 of the auxiliary rams, the latter created a suction in the closed ends of those auxiliary ram cylinders, which suction was transmitted through the pipe 61 to the main valve 49, and since land 52 has moved to the right of the opening of pipe 61 into the main valve, the pipe 61 was now connected through this main valve to the pipe 62 which leads to reservoir 26. This suction draws fluid from the reservoir 26 into the auxiliary rams as a prefilling operation during the advance of the mold block 1. Since there is no back pressure on the auxiliary rams 7 and 8, the mold block is, in a way, floating between the pistons 4 and 5. The pressure on the spacing pistons 43 is that of the pressure in the accumulator until the spacer pistons 43 are forced inwardly by the friction on the side of the mold block. As these pistons 43 are forced inwardly, the pressure on the pistons 43 is determined by the setting of the relief valve 115. With this floating support of the mold block 1, the material in the passage 2 will be compressed with approximately equal high pressure at both ends, which gives a cake of approximately uniform density at both ends.

After the cake has been fully compressed under the intensified pressure, the next operation is to operate the pilot valve 96 from the position shown in Fig. 2 to the position shown in Fig. 5. This may be performed manually by operation of the lever 106, or it may be performed automatically when the pressure in the main ram exceeds a selected pressure for which the pressure relief valve 111 was set to open. The fluid under pressure from the pipe 60 passes through pipes 109 and 112, through the pressure relief valve 111 and thence continuing through pipe 109 to the cylinder 108. The pressure in the cylinder 108 then forces the valve element 97 downwardly in Fig. 2 into the position shown in Fig. 5. When this happens, the land 104 has moved past the opening to pipe 114, and the land 103 has moved into a space immediately at one side of the annular groove 99 so as to interrupt the connection of pipe 113 to reservoir through pipe 132, see Fig. 5.

The space between the lands 103 and 104 now connects the pipes 113 and 114, with the result that some of this intensified fluid in pipe 47 will pass through pipes 114 and 113 into the chamber 58. It then enters the small cylinder 55 and forces the valve element 51 to the left as far as it will go, until the piston 57 engages with the left end of the chamber 56. The position of the valve element 51 at this time is illustrated in Fig. 5. At this time the land 53 is between the connections to pipes 47 and 60 which interrupts delivery of fluid to the main ram, and this movement of land connects the pipe 60 to a relief pipe 63 that leads to reservoir, so that the fluid from the main ram may escape back to reservoir, which permits the piston 5 to fall into the position shown in Fig. 5, which is its retracted position. The movement of the land 52 to the left in this manner served to connect the pipe 47 to the pipe 61, so that fluid under pressure from the pump will pass through the pipe 18 to the intensifier, and from the intensifier through main valve 49 and pipe 61 to the auxiliary ram cylinders, whereupon the rams 7 and 8 will then force the mold block 1 farther along past the fixed piston 4 into the position shown in Fig. 5, which will break the formed salt block free from its mold, and when the mold block 1 has been raised by high pressure from the intensifier a given amount, then the intensifier is cut out of the circuit and the mold block 1 is raised by pressure from the accumulator in cylinders 10. This raises the mold block 1 high enough to enable removal of the salt block from the press. After the cake has been ejected in this manner, illustrated in Fig. 5, the valve 79 is operated to return the mold block 1 to its retracted position. This valve 79 is a pilot valve somewhat similar to the pilot valve 84, and when its valve element 81 is moved downwardly away from the position shown in Fig. 2 into the position shown in Fig. 6, the land 82 moved out of interrupting position between the ports leading to the pipes 78 and 80 and thus placed those pipes in communication with one another. Fluid from the pump and pipe 47 may then pass through pipe 90 and pipe 80, valve 79, pipe 78 and pipe 77 to the outer end of the cylinder 56 of the main valve 49, and also at the same time it passes to the outer end of the chamber 58 of the main valve. At the same time some of the operating fluid in pipe 78 passes through the pipe 78a to pilot ram 75a to open check valve 75 forcibly and release fluid from pilot cylinder 73 of valve 66. Spring 131 may then return the valve element 70 of valve 66 to its position shown in Fig. 2 because the action of the intensifier is then no longer required.

The pressure in the chambers 56 and 58 forces the pistons 57 and 59 towards each other and this forces the main valve element 51 back into its neutral or central position shown in Fig. 2, which cuts off delivery of fluid under pressure to both the main ram and the auxiliary rams and vents all of those rams back to the reservoir. When this happens, there is no fluid pressure in the pipe 60 and thus no longer pressure in the pipe 75, so that pressure is released in the cylinder 73 which permits return of the intensifier piston 37 to its normal Fig. 2 position under the action of the spring 131. At the end of this operation the valve 79 is returned to its normal position and the parts are then in the Fig. 2 position. It will be noted that when the pressure for pipe 60 was relieved by return of the main valve element 51 to its central position, the pressure in cylinder 108 of the pilot valve 96 was relieved through the check valve 110, so that spring 134 could return the valve element 97 to its upper, original position shown in Fig. 2. Thus the cycle of operation has been completed and the press is set for a new cycle of operation.

Referring next to Figs. 7 and 8, these figures illustrate two different operative positions of parts that may be advantageously substituted for the check valve 45 and the pressure relief valve 115. In this form of the invention, the upper section of pipe 44, instead of being connected to the pressure relief valve 115 and the check valve 45, is connected to an annular groove 120 of a valve 118. A spring 135 normally holds the valve element 122 in its left position shown in Fig. 7, at which time the upper section of pipe 44 is connected through the valve 118 to the lower section of pipe 44 which leads directly to the low pressure pump. A pipe 126 is connected to the main cylinder pipe 60 and it passes through a pressure relief valve 127, which can be set to open at a selected pressure, and from the pressure relief valve, a pipe 136 leads to a cylinder 128 in which one end of the valve element 122 reciprocates as a piston. Thus, when the pressure in the pipe 60 is intensified so that the final, high pressure compression of the cake is begun, the pressure relief valve 127 will open and pass fluid to the cylinder 128, and there it will force the valve element 122 to the right into the position shown in Fig. 8.

This carries the land 123 to the right of the annular groove 120 so as to interrupt the connection between the two sections of pipe 44 and at the same time connect the upper section of the pipe 44 through the valve element 118 to the reservoir connection in pipe 125. This relieves the pressure of fluid on the spacer pistons 43 so that they may drop and thus give greater freedom of the mold block 1 to float, irrespective of the relative approach of the pistons 4 and 5. When the pressure on the main cylinder was relieved at the end of a cake forming operation, as explained above, the pressure in pipe 126 could fall because it is connected to pipe 60, and when this occurs the fluid under pressure in cylinder 128 of valve 118 may escape through check valve 130 back to the pipe 126, thus bypassing the pressure relief valve 127.

It will be understood that the pilot valve 79 may be cam operated from the mold block 1, so as to be effective when the mold block 1 has passed far enough along the piston 4 to eject the block or formed cake, but inasmuch as the cam operation of valves from a moving part of a press is common engineering practice, such cam operation has been omitted in the interest of simplicity.

It will be noted that according to this invention, the mold body, after an initial compression of the loose particles in the mold cavity, is released so as to float back and forth along the relatively approaching pistons, which floating continues until the friction between the material in the mold cavity and the side of the mold exerts a force greater than the force developed by the mold spacing cylinders. This gives an automatic control by friction, and by it one obtains a cake of approximately uniform density at both ends.

It will be understood that various changes in the details and arrangements of parts, which have been herein described and illustrated in order to explain the nature of the invention, may be made by those skilled in the art within the principle and scope of the invention as expressed in the appended claims.

We claim:

1. A hydraulic press for compressing suitable loose material into a relatively high density block, having relatively movable end members and an intermediate member arranged in a row and combining to bound a forming space subject to reduction in capacity by relative approach of said end members into said intermediate member to compress in the latter a quantity of said material confined in said space, one of said end members being relatively fixed, auxiliary fluid actuated means connected to said intermediate member for moving it towards said relatively fixed member, main fluid actuated means connected to said movable end member to move it toward said relatively fixed member, said movable end member having limited cylinders opening through that face of said movable member towards said intermediate member, a piston in each of said limited cylinders for limited endwise movement therein and projecting from said movable end member when forced outwardly to the limit permitted, a source of fluid under pressure connected to said limited cylinders to force said pistons outwardly under a selected relatively low pressure as compared to the pressure forcing said movable end member toward the other end member, means for selectively rendering said main fluid actuated means effective to advance or release said movable end member, means for selectively rendering said auxiliary fluid actuated means effective to advance said intermediate member or release it, and means operable to intensify the fluid pressure acting on said main fluid actuated means.

2. In a cake press, a mold block with a passage from face to face therethrough, a relatively fixed piston at one side of said block and normally spaced therefrom but alined with the adjacent end of said passage and of a size to enter and fit it when said block moves toward it, a relatively movable piston alined with said fixed piston with its free end just within and closing the other end of said passage, an auxiliary hydraulic ram fixed to said block at the same side thereof as said movable piston for advancing said block towards said fixed piston, a main hydraulic ram operable on said movable piston for advancing it towards said fixed piston, a source of fluid under pressure connected to each of said rams, valve means controlling the flow of fluid from said source to each of said rams and releasing pressure from each ram when that ram is cut off from fluid from said source, means for selectively supplying fluid under a relatively higher pressure to said main ram, and retractible but hydraulically advanced spacing means acting between said block and movable piston for preventing advance of said movable piston along said passage for a desired distance of travel of that piston and the block together towards said fixed piston by a pressure which is less than the final fluid pressure exerted by said relatively higher pressure.

3. In a cake press, a mold block member having a passage from face to face, a fixed piston member and a movable piston part disposed at opposite faces of said block member in alinement with and extending toward said passage and with their free ends of a size and shape to enter the ends of said passage and compress between them into a cake any loose materials in said passage, an auxiliary hydraulic ram attached to said block member for dvancing it toward the fixed piston member, a main hydraulic ram attached to said movable piston member for advancing it toward the fixed piston member, yieldable spacer means acting between said block member and movable piston member for keeping the block member spaced from the movable piston member as the latter advances toward the fixed piston member and engages and carries the block member with it, said spacer means including a cylinder carried by one of the movable members and opening toward the other movable member, and a limited piston in said cylinder and operable therein toward and from said other movable member, to space the movable members when the limited piston extends from the member which carries it, said limited piston and its cylinder having coacting parts that limit outward movement of the limited piston when fluid under pressure is admitted to said cylinder, a source of fluid under pressure connected to said cylinder, means for delivering a fluid under pressure to said main ram and to said auxiliary ram selectively, and means for selectively increasing the pressure of the fluid admitted to said main ram.

4. A cake press comprising a mold block having a passage from face to face, a fixed piston and a movable piston disposed at opposite faces of said block in alinement with an extending toward said passage and with their free ends of a size and shape to enter and close the ends of said passage and compress between them any loose material within said passage, means mounting said piston and block for movement toward and from said fixed piston, a fluid operated ram for advancing said movable piston towards the fixed piston, yieldable spacing means acting between said movable piston and said block for preventing advance of the movable piston along said passage, after entry to a desired extent, as the movable piston moves toward the fixed piston and carries the block with it, until a desired pressure on material in said passage is exceeded, and a valve controlled connection leading to said ram for supplying thereto an operating fluid under pressure, said spacing means including a fluid operated piston movable between retracted and extended spacing positions and which, when extended, spaces said block and movable piston, a branch connection from said valve controlled connection for supplying some of the fluid under pressure to said spacing means, said piston of said spacing means exerting considerably less force separating the block and movable piston than that exerted by said ram when said block encounters selected resistance to its advance toward said fixed position.

5. A cake press comprising a mold block with a passage from face to face, a fixed piston and a movable piston disposed at opposite faces of said block with their free ends axially alined with and extending towards the passage and of sizes to enter and close the ends of the passage, an auxiliary ram attached to said block to advance it toward the fixed piston, a main ram attached to said movable piston to advance it toward said fixed piston, a source of fluid under pressure, a main valve operable to connect said source alternately to said rams and to release pressure from each ram when it is cut off from said source, a check valve in the connection from said source to said main valve, and passing fluid solely to said main valve, a pressure intensifier connected to said source before said check valve and to said main valve beyond said check valve, an intensifier valve controlling passage of fluid from said source to said intensifier, and fluid advanced spacer means connected to said source before said check valve for spacing said block and movable piston as the movable piston advances toward the fixed piston and carries with it said block, whereby when said intensifier is active the spacer means will yield and permit relative approach of said block and movable piston.

6. The press as set forth in claim 5, and a check valve in the connection between said spacer means and said source, operable to pass fluid solely towards said spacer means, and a pressure relief valve connected to said spacer means, free of said last mentioned check valve, for releasing fluid pressure on said spacer means above a selected pressure.

7. In a cake press, a mold block having therein a molding passage extending from face to face therethrough, a fixed piston at one side of the block and alined with said passage to enter it at one end and pass well along it upon relative movement of the block and piston, a member at the side of the block opposite said piston and movable toward and from said piston, an opposing piston carried by said member and also alined with said passage to enter the other end of the passage and pass along it, main fluid motor means operable on said member to advance it and cause said opposing piston to move toward the fixed piston and pick up and move with it said mold block, spacer means on said member and having fluid operated spacer pistons with limited movement on said member toward and from the mold block and operable when activated to normally space said mold block to a limited extent from said member during movement of said mold block by said member, auxiliary fluid motor means operable on said mold block to advance it along said fixed piston far enough to eject from said passage any pressed cake in said passage while said opposing piston is out of said passage, a source of operating fluid under pressure, a connection having therein a check valve between said source and spacer means for supplying operating fluid under pressure continuously to said spacer means and preventing reverse flow, a pressure relief valve connected to said spacer means for releasing fluid from said spacer means when the pressure in the spacer means is above a selected pressure, and valve controlled means having one connection to said source, and separate connections to said motor means and having a valve element operable between two positions for connecting said source to said motor means alternately and having an intermediate idle position in which it disconnects said source from both motor means and releases any pressure in both motor means.

8. The press as set forth in claim 7, and a fluid intensifier having a low pressure intake connected to said one connection to receive fluid from said source and having a high pressure output connected to said one connection nearer said valve controlled means, said one connection having in series therein a check valve between the said intake and output connections to said one connection, and means for rendering said intensifier active or inactive.

9. The press as set forth in claim 8 wherein said last named means includes a valve in said input connection between the intensifier and said source biased to closed position, and also means operable to operate said valve against its bias to activate said intensifier whenever the pressure on said main motor means exceeds a selected pressure.

10. The press as set forth in claim 8, wherein said last named means includes a central valve in said input connection between the intensifier and said source and having a pilot motor responsive to fluid pressure to operate said control valve to connect said source to said intensifier, a fluid connection from said main motor means to said pilot motor and having in series therein a check valve opening toward said pilot motor and pilot means, connected to said source, said pilot motor and said control valve, and effective, when activated, to center said valve element and open said last mentioned check valve.

11. The press as set forth in claim 7, wherein said valve controlled means has two fluid actuated motors for operating said valve element selectively into each of said two positions, a pilot valve connected to said source and to one of said two fluid actuated motors and operable to pass fluid from said source to said one of said two fluid actuated motors to cause operation of said valve element into one of its two positions in which it connects said source to said main motor means and starts an advance of said member, another pilot valve connected to said source and to the other of said two fluid actuated motors effective when operated to pass fluid from said source to said other of said two fluid actuated motors and thereby cause operation of said valve element into its other of its two positions in which it disconnects said source from said main motor and connects said source to said auxiliary motor and cause movement of the mold block along said fixed piston and eject any pressed cake from said passage.

12. The press as set forth in claim 11, and means responsive to fluid pressure in said main motor for operating said another pilot valve in a direction to cause movement of said valve element when the fluid pressure on said main motor exceeds a selected pressure.

References Cited in the file of this patent

UNITED STATES PATENTS

| | | |
|---|---|---|
| 1,765,626 | Stacy | June 24, 1930 |
| 1,893,996 | Kershner | Jan. 10, 1933 |
| 2,109,391 | Lauck et al. | Feb. 22, 1938 |
| 2,398,227 | Hubbert | Apr. 9, 1946 |
| 2,481,991 | Ernst | Sept. 13, 1949 |
| 2,582,260 | Kutik | Jan. 15, 1952 |